(12) United States Patent
Krupa et al.

(10) Patent No.: US 10,502,347 B2
(45) Date of Patent: Dec. 10, 2019

(54) QUICK CONNECTOR DEVICE

(71) Applicant: DELPHI AUTOMOTIVE SYSTEMS LUXEMBOURG SA, Bascharage (LU)

(72) Inventors: Andrzej Krupa, Ostrow (PL); Krystian Klemt, Ostrow (PL)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 499 days.

(21) Appl. No.: 14/761,426

(22) PCT Filed: Dec. 16, 2013

(86) PCT No.: PCT/EP2013/076729
§ 371 (c)(1),
(2) Date: Jul. 16, 2015

(87) PCT Pub. No.: WO2014/111214
PCT Pub. Date: Jul. 24, 2014

(65) Prior Publication Data
US 2015/0354736 A1  Dec. 10, 2015

(30) Foreign Application Priority Data
Jan. 17, 2013  (FR) ..................................... 13 50395

(51) Int. Cl.
*F16L 21/00* (2006.01)
*F16L 13/02* (2006.01)
(Continued)

(52) U.S. Cl.
CPC .............. *F16L 21/00* (2013.01); *F16L 13/02* (2013.01); *F16L 37/086* (2013.01); *F16L 37/088* (2013.01)

(58) Field of Classification Search
CPC ....... F16L 37/244; F16L 37/248; F16L 37/04; F16L 37/088; F16L 13/147; F16L 13/166
(Continued)

(56) References Cited

U.S. PATENT DOCUMENTS 5,113,571 A  5/1992  Manska
5,607,190 A * 3/1997  Exandier ............. F16L 37/0985
285/308

(Continued)

FOREIGN PATENT DOCUMENTS

DE  1 929 147 A1  12/1970
EP  0 959 291 A2  11/1999
JP  6-50483 A     2/1994

OTHER PUBLICATIONS

European Patent Office, Rijswijk, Netherlands, International Search Report of International Application No. PCT/EP2013/076729, dated Feb. 17, 2014, 2 pages.

*Primary Examiner* — Aaron M Dunwoody
(74) *Attorney, Agent, or Firm* — Brinks Gilson & Lione

(57) ABSTRACT

The production of a quick connection device including a metal journal that fits in a complementary manner into a connector is performed by a process including the following steps: a metal tube is extruded to form a blank of the journal extending longitudinally from a large end to a small end along a first cylindrical portion; from the first cylindrical portion, the blank narrows along a conical portion to a second cylindrical portion. The wall of the tubular blank has a thickness that is substantially constant in all three portions.

9 Claims, 1 Drawing Sheet

(51) Int. Cl.
*F16L 37/086* (2006.01)
*F16L 37/088* (2006.01)

(58) Field of Classification Search
USPC ............ 285/305, 321, 401, 402, 396, 382.2, 285/382.4
See application file for complete search history.

(56) References Cited

U.S. PATENT DOCUMENTS

| | | | | |
|---|---|---|---|---|
| 5,860,677 | A * | 1/1999 | Martins | F16L 37/088 285/26 |
| 6,386,596 | B1 * | 5/2002 | Olson | F16L 37/0925 285/305 |
| 2001/0002754 | A1 * | 6/2001 | Dobler | F16L 37/088 285/321 |
| 2009/0102181 | A1 * | 4/2009 | Hartmann | F16L 37/088 285/26 |
| 2011/0089681 | A1 * | 4/2011 | Schutte | F16L 37/084 285/148.19 |
| 2011/0148107 | A1 * | 6/2011 | Blivet | F16L 37/0841 285/402 |
| 2013/0233053 | A1 * | 9/2013 | Beemer | B01L 3/563 73/23.35 |
| 2014/0001743 | A1 * | 1/2014 | Keren | F16L 33/225 285/5 |
| 2015/0101173 | A1 * | 4/2015 | Hartmann | F16L 37/088 29/525.01 |
| 2015/0354742 | A1 * | 12/2015 | Holtby | F16L 21/08 285/308 |
| 2017/0146159 | A1 * | 5/2017 | Hartmann | F16L 13/147 |
| 2017/0165699 | A1 * | 6/2017 | Graef | B05B 15/065 |
| 2017/0356581 | A1 * | 12/2017 | Trotter | F16L 37/088 |

* cited by examiner

QUICK CONNECTOR DEVICE

TECHNICAL FIELD

The invention relates to a process for manufacturing a quick connection between two tubular components.

TECHNICAL BACKGROUND OF THE INVENTION

Devices for the quick connection of two tubular components comprising a male endpiece, or journal, fixed to one of the components, and a female endpiece, or connector, fixed to the other component, already exist. Assembling the journal into the connector in complementary fashion seals the connection. The assembly is held in place by an elastic clip secured to the connector which, upon assembly, moves aside to allow the journal to engage then becomes lodged in a transverse groove provided in the journal. In addition, the journal is provided with two tabs and the connector with two complementary grooves forming a means for preventing the components from turning. The connector and the journal are made of molded plastic and a complex mold is needed. Notably inserts are provided for forming the grooves for positioning the clip. In addition, the imposed shape does not make for easy manufacture of metal journals.

SUMMARY OF THE INVENTION

The present invention addresses these problems by proposing a simple method for producing a quick connection device comprising a metal journal, for example made of aluminum alloy, copper, brass or even steel, that fits in a complementary manner into a connector. The process comprises the step of, by extrusion of a metal tube made of aluminum alloy or the like, forming a blank of the journal extending longitudinally from a large end to a small end along a first cylindrical portion, then narrowing along a conical portion then along a second cylindrical portion, the wall of the tubular blank being of a thickness that is substantially constant in all three portions. The extrusion step further comprises the formation of two longitudinal tabs produced on the exterior surface of the first portion, the tabs being diametrically opposite and part of a device that prevents the device from turning.

The process additionally comprises the step of making, in the first portion, two transverse cuts through the wall of the first portion, the cuts forming open apertures separated by the two tabs. These cuts can be made in a number of ways, notably by transverse sawing. Using straight or circular saws, the apertures can be made one after another or alternatively simultaneously. The apertures may also be produced by radial stamping after a mandrel has been inserted up inside the journal to prevent deformation.

The invention also relates to a process for producing a quick connection by push-fitting in a complementary manner a journal, secured to a first tubular component, into a connector secured to a second tubular component, the process of producing the connection comprising the step of providing a journal produced according to the previous paragraph, the first portion of the journal having an inside diameter matched to the outside diameter of the first component and an outside diameter matched to the inside diameter of the connector. The process also comprises the step of inserting the first component into the first portion so that the journal butts against the end of the first tubular component. The apertures are then closed by the first component. The process also comprises the step of fixing the journal on the end of the first component.

The fixing may comprise a step of temporary fixing which is achieved by local deformation of the first component by producing radial protrusions that become lodged in the apertures. Temporary fixing comes prior to a step of permanent fixing which may be performed using brazing. It is then advantageous to provide a braze washer of which the outside and inside diameters are substantially those of the first tubular component, then to arrange the braze washer in the journal before the first component is inserted into the first portion of the journal, so that once the first component has been inserted, the braze washer finds itself trapped between the journal and the first component.

The invention further relates to a quick connection device comprising a journal that fits in a complementary manner into a connector, the device being produced according to the preceding paragraphs.

BRIEF DESCRIPTION OF THE DRAWINGS

One embodiment of the invention is now described via the following figures.

The figures are provided for purely illustrative purposes and are not intended to limit the scope of the present invention.

DETAILED DESCRIPTION OF THE PREFERRED EMBODIMENTS

Figure 1:
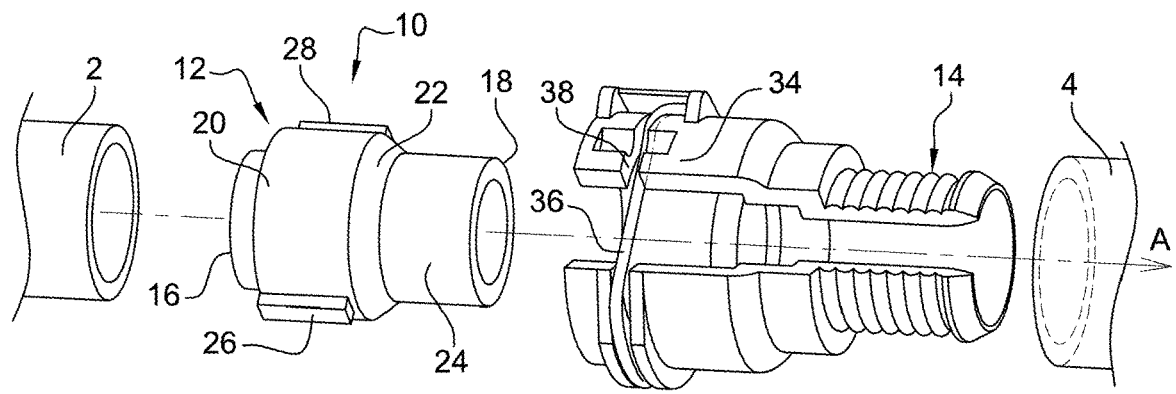
FIG. 1 is an isometric view of a quick connection device comprising a journal and a connector, the device not being assembled.
Figure 2:
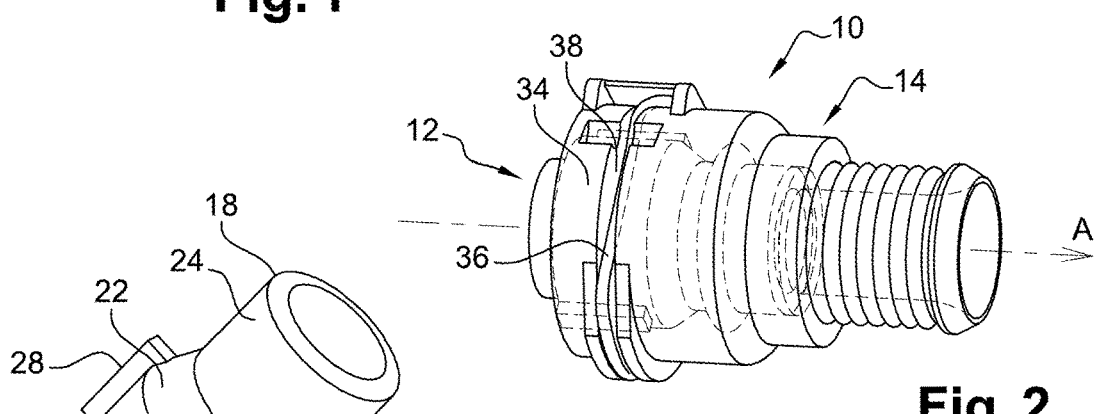
FIG. 2 depicts the device of FIG. 1, assembled.

According to FIGS. 1 and 2, a first and a second tubular component 2, 4 are connected using a quick-assembly device 10. The device 10 comprises a metal journal 12, for example made of aluminum, of copper, of brass or even of steel, secured to the endpiece of the first component 2 and a female connector 14 secured to the endpiece of the second tubular component 4. The journal 12 is tubular and extends along the longitudinal axis A from a large end 16 engaged over the first tubular component 2 to a small end 18 which is free. Between its two ends 16, 18, the journal 12 comprises a first cylindrical portion 20, then a conical portion 22, then a second cylindrical portion 24, of a diameter smaller than that of the first portion 20. The first portion 20 is provided with two longitudinal tabs 26, 28 which are diametrically opposite and designed to engage in complementary grooves of the connector 14 and thus prevent the journal 12 from turning relative to the connector 14. The first portion 20 is additionally provided with two transverse openings 30, 32, forming two apertures facing one another, each extending between the tabs 26, 28.

The connector 14 comprises a tubular cylindrical portion 34 of which the inside diameter allows the first portion 20 of the journal 12 to be inserted as a just-sliding fit. This portion 34 is provided with a U-shaped elastic clip 36, the branches of which pass through transverse openings 38 of the connector 14. The U-shape of the clip is just one illustrative example and numerous alternatives may exist.

As the journal 12 is engaged in the connector 14, the free small end 18 and the second cylindrical portion 24 of the journal pass between the branches of the U. Next, the conical portion 22 parts the branches of the U elastically in order to allow the first cylindrical portion 20 to pass. When the journal 12 is fully engaged in the connector 14, the transverse apertures 30, 32 of the journal 12 are positioned facing the transverse openings 38 of the connector 14, and the clip 36 returns to its original U-shape, the branches of the clip 36 engaging in the apertures 30, 32 of the journal 12. The device 10 is thus held axially in position and can be disconnected only by parting the branches of the clip 36 and then pulling on the first component 2 in order to disengage the journal 12.

Figure 3:
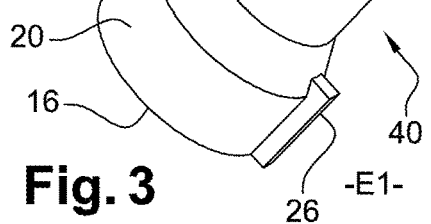
FIG. 3 is a blank of the journal of FIG. 1.

According to FIG. 3, during a first step E1 of manufacture, a blank 40 of the journal 12 is produced by extruding a metal tube, made of aluminum or some other metal. At the end of this first step E1, the blank 40 comprises the first cylindrical portion 20, the conical portion 22 and the second cylindrical portion 24 as well as the longitudinal tabs 26, 28. The extrusion process is accurate enough that the dimensions obtained do not have to be reworked subsequently using other means.

Figure 4:
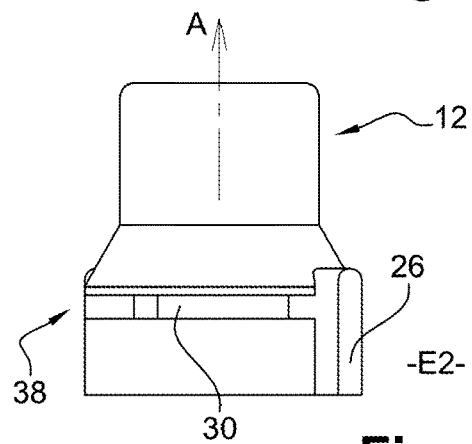
FIG. 4 is a view of the completed journal.

According to FIG. 4, during a second step E2 of manufacture, the apertures 30, 32 are created by transverse cutting or alternatively by stamping after having inserted a mandrel up inside the blank 40. Other alternatives exist and the choice of alternative is notably dependent on the quantity of components to be produced.

At the end of the second step E2, the metal journal 12 is complete.

Figure 5:
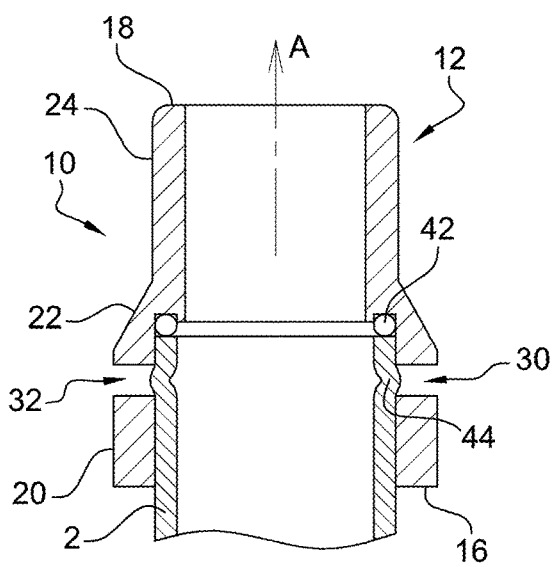
FIG. 5 is a cross section of the assembly of the journal of FIG. 4 on the end of a tubular component.

According to FIG. 5, during a third step E3, the completed journal 12 is mounted on the end of the first tubular component 2 by engaging said first component 2 into the first cylindrical portion 20 until it has passed the transverse apertures 30, 32 and come into abutment in the conical portion 22. A braze washer 42 has been interposed between the end of the first tubular component 2 and the journal 12, this washer being intended to melt during a subsequent brazing operation and thus permanently join the journal 12 and the first component 2 together. The composition of the braze washer is dependent on the metal chosen from which to produce the journal 12. For example, in the case of a journal 12 made of aluminum alloy, the braze washer 42 is made of an alloy of aluminum and silicon, the melting point of which is below that of aluminum. As can be seen in the cross section of FIG. 5 and in FIG. 6, because the first tubular component 22 is engaged beyond the transverse apertures 30, 32, this first component 2 closes off said apertures 30, 32. Alternatively, the journal could be covered with brazing flux, something which makes it possible not to fit a braze washer.

At the end of the third step E3, the journal 12 is placed on the end of the first tubular component 2.

Figure 6:
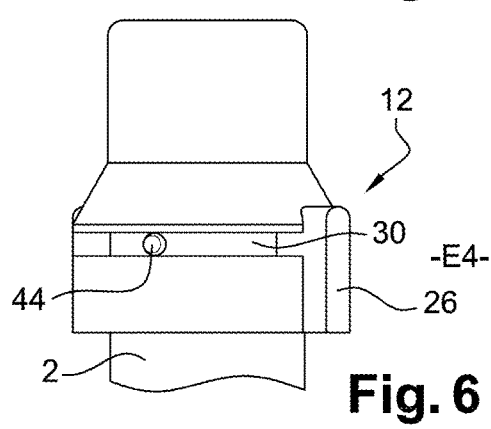
FIG. 6 is an isometric view of the final assembly.

According to FIG. 6, during a fourth step E4, the journal 12 is fixed temporarily to the first component 2 by radially deforming the first component 2 so as to produce protuberances 44 which enter the transverse apertures 30, 32. In order to produce these deformations, a tool, not depicted, is inserted inside the journal 12 via the small end 18 until it is positioned in line with the apertures 30, 32. The tool is then expanded so as to deform the material of the first component 2 and produce the protrusions 44.

A fifth operation E5, not depicted, involves brazing the whole so as to assemble the journal 12 permanently on the end of the first component 2. During brazing, the washer 42 melts, joining the journal 12 and the first tubular component 2.

Different sized connection devices 10 may thus be produced to fit the components that are to be connected. Connections of this type may for example be used within a vehicle heat exchange circuit, notably the engine cooling circuit, to connect a radiator to the pipes through which the coolant flows.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A quick connection device for a connector, the quick connection device comprising:
   a journal sized to fit in a complementary manner into the connector journal including:
      a metal tube formed from a tubular blank of the journal extending longitudinally from a large end to a small end along a first cylindrical portion along a longitudinal axis, narrowing from the first cylindrical portion along a conical portion toward a second cylindrical portion, the tubular blank having a first inner diameter in the first cylindrical portion and a second inner diameter in the second cylindrical portion, the second inner diameter being smaller than the first inner diameter,
      two longitudinal tabs protruding from an exterior surface of the first cylindrical portion, the tabs being diametrically opposite from each other and part of an anti-rotation device that is configured to prevent the journal from turning; and
      two transverse cuts through the wall of the first cylindrical portion at the first inner diameter, the cuts forming open apertures separated by the two longitudinal tabs, and
   a tubular component in the first cylindrical portion,
   wherein the transverse cuts of the first cylindrical portion accommodate a local protrusion of the tubular component.

2. The quick connection device according to claim 1, wherein the first inner diameter of the first cylindrical portion extends longitudinally past the two transverse cuts and is configured to cause the tubular component to close the two transverse cuts inside the first cylindrical portion when the tubular component is inserted into the first cylindrical portion.

3. The quick connection device according to claim 1, wherein the conical portion includes a step connecting the first inner diameter with the second inner diameter.

4. A quick connection device for a connector, the quick connection device comprising:
   a journal sized to fit in a complementary manner into the connector, the journal including:

a metal tube formed from a tubular blank of the journal extending longitudinally from a large end to a small end along a first cylindrical portion along a longitudinal axis, narrowing from the first cylindrical portion along a conical portion toward a second cylindrical portion, the tubular blank having a first inner diameter in the first cylindrical portion and a second inner diameter in the second cylindrical portion, the second inner diameter being smaller than the first inner diameter, two longitudinal tabs protruding from an exterior surface of the first cylindrical portion, the tabs being diametrically opposite from each other and part of an anti-rotation device that is configured to prevent the journal from turning in the connector; and two transverse cuts through the wall of the first cylindrical portion at the first inner diameter, the cuts forming open apertures separated by the two longitudinal tabs, wherein the conical portion includes a step connecting the first inner diameter with the second inner diameter, and a tubular component in the first cylindrical portion, wherein the transverse cuts of the first cylindrical portion accommodate a local protrusion of the tubular component and receive a clip for engaging with the connector.

5. A method for producing a quick connection by push-fitting in a complementary manner a journal, secured to a first tubular component, into a connector secured to a second tubular component, the method comprising the steps of:

providing a journal having a tubular blank extending longitudinally from a large end to a small end along a first cylindrical portion along a longitudinal axis, narrowing from the first cylindrical portion along a conical portion toward a second cylindrical portion, the tubular blank having a wall of a thickness that is substantially constant in the first cylindrical portion, the conical portion and the second cylindrical portion, and having a first inner diameter in the first cylindrical portion and a second inner diameter in the second cylindrical portion, the second inner diameter being smaller than the first inner diameter, the first cylindrical portion of the journal having two longitudinal tabs protruding from an exterior surface of the first cylindrical portion, the tabs being diametrically opposite from each other and part of an anti-rotation device that is configured to prevent the journal from turning, the first portion of the journal also having two transverse cuts through the wall of the first cylindrical portion at the first inner diameter, the cuts forming open apertures separated by the two longitudinal tabs, the first cylindrical portion of the journal having an inside diameter matched to an outside diameter of the first tubular component and the first cylindrical portion having an outside diameter matched to an inside diameter of the connector;

inserting the first tubular component into the first cylindrical portion so that the journal abuts an end of the first tubular component, the apertures being closed by the first tubular component;

locally deforming the first tubular component and producing a protrusion to enter the transverse cuts; and fixing the journal at the end of the first tubular component.

6. The method for producing a quick connection as claimed in claim 5, wherein the step of fixing the journal on the end of the first tubular component comprises a step of temporary fixing performed by local deformation of the first tubular component by making radial protrusions that become lodged in the apertures.

7. The method for producing a quick connection as claimed in claim 5, wherein the step of fixing the journal comprises a step of permanent fixing of the journal at the end of the first tubular component.

8. The method for producing a quick connection as claimed in claim 7, wherein the permanent fixing is performed by brazing.

9. The method for producing a quick connection as claimed in claim 8, additionally comprising the steps of:

providing a braze washer wherein outside and inside diameters of the braze washer are substantially equal to those of the first tubular component;

arranging the braze washer in the journal before the first tubular component is inserted in the first cylindrical portion of the journal, so that, once the first tubular component has been inserted, the braze washer is trapped between the journal and the first tubular component.

* * * * *